Oct. 29, 1935.  G. B. WARREN  2,019,329
METHOD OF MAKING TURBINE BUCKETS
Filed Sept. 30, 1933
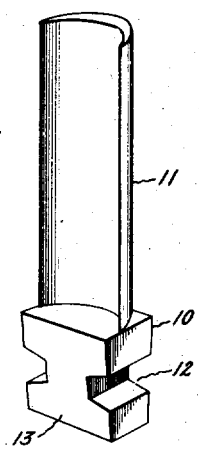
Fig. 1.
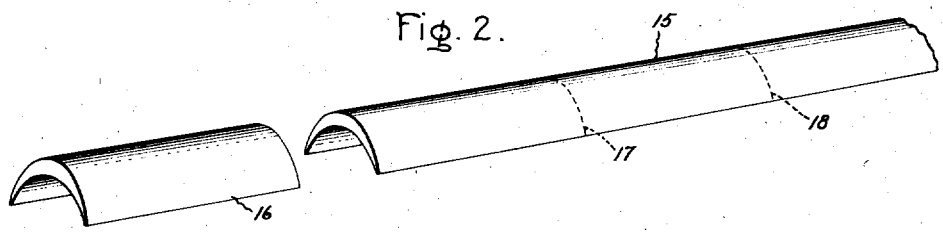
Fig. 2.
Fig. 4.
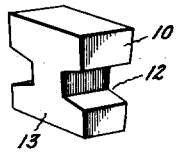
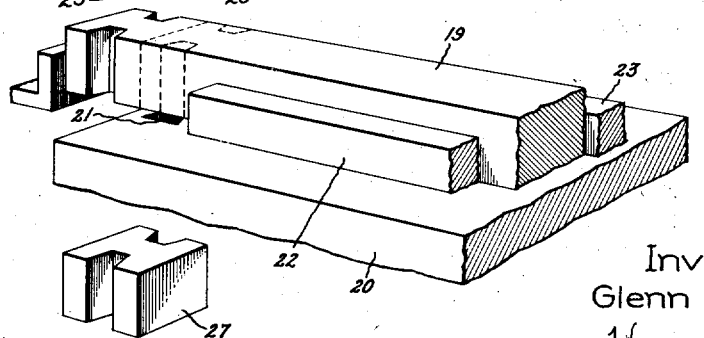
Fig. 3.
Inventor:
Glenn B. Warren,
by Harry E. Dunham
His Attorney.

Patented Oct. 29, 1935

2,019,329

UNITED STATES PATENT OFFICE 2,019,329

METHOD OF MAKING TURBINE BUCKETS

Glenn B. Warren, Schenectady, N. Y., assignor to General Electric Company, a corporation of New York Application September 30, 1933, Serial No. 691,690

1 Claim. (Cl. 29—156.8)

The present invention relates to turbine buckets comprising a blade and a base to be fastened to the rim of a wheel or disk. The base is usually dove-tail shaped and held in a correspondingly shaped rim of a disk.

An object of my invention is to provide an improved method of manufacturing buckets whereby the manufacturing cost is considerably reduced. These objects are accomplished by manufacturing the bucket in two separate parts; a base and a blade sawed or punched from strips or blocks of material, in contrast to methods heretofore used according to which both parts were made from a single block of material. In making a bucket of two separate parts and welding them together, these parts are preferably made of different kinds of material; low cost material for low stressed bases; high strength material for high stressed bases; and a noncorroding steel or other suitable high grade material for the blades.

For a better understanding of what I consider to be novel and my invention, attention is directed to the following description and the claim appended thereto in connection with the accompanying drawing which forms a part of my specification.

In the drawing, Fig. 1 represents a bucket made according to my invention, and Figs. 2 to 4 inclusive illustrate different parts of buckets in their different stages of manufacture, Fig. 3 including a tool for punching the bucket base.

The bucket shown in Fig. 1 comprises a base 10 and a blade 11. The base has recesses 12 defining dovetails to be held in the rim of a wheel, not shown. Opposite sides 13 of the base are tapered so that the sides of these bases when fastened to the rim fully engage each other. The manufacture of the kind of turbine bucket from a single piece of material as just described is rather expensive, owing to the entirely different shape of the blade and base portions. In addition, in cases where the blade is exposed to high temperature elastic fluid, it was heretofore necessary to use high grade expensive material for both the blade and the base portions. The high cost is considerably reduced by my invention which, as stated above, comprises the separate manufacture of the base and the blade and the uniting of these parts by fused metal. The blade is cut from a strip of drawmill material 15. This material may consist of a material known as stellite or high grade steel which does not corrode when exposed to elastic fluid. At the left of Fig. 2 I have shown a blade 16, corresponding to blade 11 of Fig. 1, cut off, and on the right-hand side I have indicated by dotted lines 17 and 18 the cuts to be made to form two other blades from the strip 15.

The bases may be cut from a block in the manner indicated in Fig. 2 with respect to the manufacture of the blades. Dovetail grooves 10 may be formed in the base before or after the latter has been cut from the block. The base is then machined and finished, as shown in Fig. 4, to be united with a blade by means of fused metal.

Fig. 3 shows diagrammatically another method of forming the bases of the blades which in the present instance are punched from r block of material 19. The material of the block is preferably a low grade steel, less expensive than the material for the blades. The block is positioned on a table 20 having a left-hand portion defining a female die with openings 21, and comprising guides 22 and 23 for holding the block 19 in position. The punching operation performed by a male die 24 having cutting or shearing edges 25 and 26 is indicated in dotted lines on the block 19. At 27 I have shown a base punched from the block 19. After the punching operation the sides of the base 25 are tapered and the base is completed to attain the shape indicated in Fig. 4. When the base and the blade are finished they are welded together by any desirable method, preferably by flash-welding, to form a bucket as shown in Fig. 1.

With my invention I have accomplished an improved structure and method of manufacturing buckets whereby the cost of manufacture is considerably reduced. It has been found that for special size buckets this cost is reduced by about 50 to 75 percent of the cost necessary to manufacture a bucket from a single piece of material.

What I claim as new and desire to secure by Letters Patent of the United States, is:

The method of manufacturing turbine buckets comprising the steps of forming a strip of non-corrosive material having the cross-section of the bucket blade, cutting the strip in lengths to form blades, forming a block of material, punching a plurality of bases from the block, and welding the blades to the bases.

GLENN B. WARREN.